Figure 1:
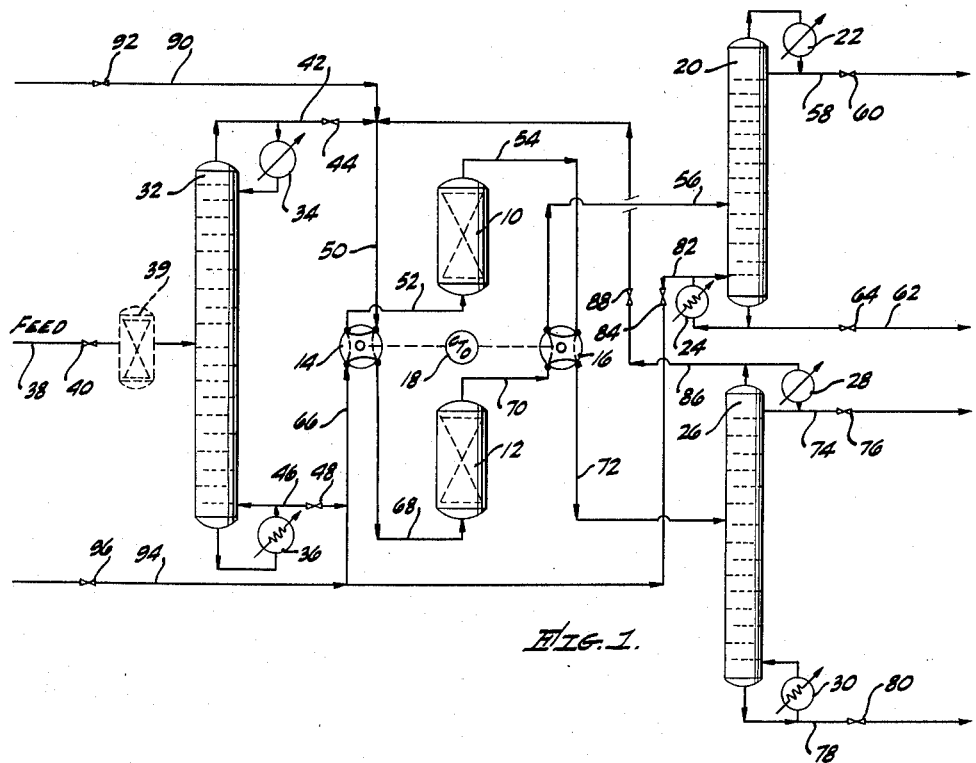

May 3, 1960 R. N. FLECK ET AL 2,935,467
FRACTIONATION PROCESS USING ZEOLITIC MOLECULAR SIEVES
Filed July 27, 1956

INVENTORS.
RAYMOND N. FLECK,
CARLYLE G. WIGHT,
BY

ATTORNEY.

United States Patent Office 2,935,467
Patented May 3, 1960

2,935,467

FRACTIONATION PROCESS USING ZEOLITIC MOLECULAR SIEVES

Raymond N. Fleck, Whittier, and Carlyle G. Wight, Fullerton, Calif., assignors to Union Oil Company of California, Los Angeles, Calif., a corporation of California Application July 27, 1956, Serial No. 600,571

9 Claims. (Cl. 208—310)

This invention relates to the fractionation of fluid mixtures, either gaseous or liquid, such as mixtures of hydrocarbons. The invention relates particularly to an improved process and apparatus for the fractionation of complex hydrocarbon mixtures in the gasoline boiling range to produce a high antiknock rating gasoline through the selective removal of low antiknock rating components.

The present invention is directed to an improved process for increasing the antiknock rating of straight-run or cracked gasolines without high temperature treatment, and which is also applicable to the improvement of fairly high antiknock rating gasolines such as those produced in high temperature thermal or catalytic treatments. Specifically, the process comprises the separation of low antiknock components from these materials so as to leave only the high antiknock rating materials. The process involves the selective adsorption of normal paraffins or normal olefins from the mixture of hydrocarbons on the basis of their straight chain molecular shape. The process however does not require the usual high temperature desorption of the rich adsorbent which is conventionally used in all other adsorptive fractionation processes. Thus the adsorbent saturated with low antiknock rating components need not be heated, or stripped with a stripping gas, or both, to render it reusable in the process. Rather, the adsorbent is subjected to a novel and simple treatment in which an active exchange or displacement of the low antiknock rating materials is effected by means of a selected second feed stream of different boiling point or range. The process thus produces a first effluent including the unadsorbed or raffinate fraction of the first feed stream and the adsorbed or extract components of the second feed stream, and a second effluent stream including the unadsorbed fraction of the second feed together with the adsorbed fraction of the first feed. The adsorbed material can be separated from the non-adsorbed material in each effluent stream by ordinary distillation.

It is a primary object of this invention to provide an improved fractionation process using a solid granular adsorbent exhibiting strong tendencies toward preferential adsorption of materials having specific molecular shapes and in which process the usual adsorbent desorption, heating, and stripping steps have been eliminated.

It is also an object of this invention to provide an improved selective adsorption and distillation process in which the adsorbent at all times is being contacted by and is fractionating a feed stream and at no time is being heated or stripped, or both, in the absence of the feed.

It is another object of this invention to provide a selective adsorption process in which the adsorbent is alternately contacted with the feed streams of different boiling point or boiling range and during each of these contacts there is maintained an active displacement exchange between the adsorbed components of one feed stream with the adsorbable components of the other feed stream thereby eliminating the requirement of a separate adsorbent desorption step.

It is a specific object of this invention to provide an improved fractionation process for complex mixtures like gasoline in which each of a plurality of adsorbent beds is alternately contacted with a light or relatively low-boiling portion of the feed and then is contacted with a heavy or relatively high-boiling portion of the feed to produce from one contact a light unadsorbed raffinate or first effluent material containing displaced heavy adsorbable extract components and to produce from the other contact a heavy unadsorbed raffinate or second effluent material containing displaced light adsorbable extract materials, each of these effluents being fractionally distilled to separate the more readily adsorbable material components from the less readily or unadsorbed materials.

Other objects and advantages of this invention will become apparent to those skilled in the art as the description and illustration thereof proceed.

Briefly, the present invention comprises an improved fractionation process involving combined steps of selective adsorption and distillation and which is unusually well adapted to the separation of complex mixtures of components. This process is characterized by the complete elimination of the heating or stripping steps heretofore required in adsorptive fractionation processes. In this improved process the desorption of adsorbed materials is effected by contacting the rich adsorbent containing such materials with another feed stream containing only components having boiling points different from those of the adsorbed materials. This produces an unadsorbed material from one feed containing the desorbed or displaced material of the other feed. The boiling points or boiling ranges of these materials being substantially different, the unadsorbed components of one feed are readily separable from the displaced adsorbable components of the other feed by ordinary distillation of the effluent stream from each contact.

For example, in the fractionation of gasoline streams by the process of this invention, the two feed streams of substantially different boiling points required may either be provided by splitting a single wide boiling range feed through distillation into two parts, such as a relatively light fraction containing the $C_4$ through 200° F. boiling point materials and a relatively heavy fraction containing the 200° F. through 410° F. boiling point materials for example, or through the selection of two independent gasoline streams having suitably different boiling ranges. The adsorbent material employed in this process for gasoline fractionation is a particular type of zeolitic silicate, hereinafter more fully described, which adsorbs straight-chain paraffin hydrocarbons and rejects non-straight-chain hydrocarbons.

When applied to the treatment of light and heavy gasoline streams comprising straight chain and non-straight chain hydrocarbons, the adsorbent already containing the straight chain components of the heavy feed stream is contacted with the light feed stream. An active displacement exchange occurs on the adsorbent whereby the light straight chain constituents are adsorbed on the adsorbent thereby exchanging with and displacing the adsorbed straight chain constituents from the heavy feed stream. This produces an adsorbent which is saturated with the light straight chain constituents and produces an unadsorbed light raffinate or first effluent containing the light non-straight chain constituents together with the displaced heavy straight chain constituents. Because of their different boiling ranges these materials in the light raffinate are readily separable by ordinary distillation. Then the adsorbent containing the adsorbed light straight chain constituents is contacted with the heavy feed stream. This causes a reverse displacement exchange to take place in which the heavy straight chain constituents are adsorbed thereby exchanging with and displacing the adsorbed light straight chain constituents. This produces an adsorbent saturated with the heavy straight chain constituents and a heavy unadsorbed raffinate or second effluent consisting of the heavy non-straight chain constituents together with the displaced light straight chain constituents. Again, because of the difference in boiling point of the original feed streams, these constituents are also readily separable by ordinary distillation. The adsorbent contact is then repeated and may be either in the liquid or vapor phase.

When one stream is originally split as by distillation into the light and heavy feed streams characteristic of this process, either the cut point between the light and heavy fractions is selected to produce equivalent quantities of straight chain materials in each cut, or a part of the separated straight chain constituents of either the first or second effluent streams is recycled for mixture with either the light or the heavy feed stream respectively to produce in these feed streams such equivalent amounts of adsorbable materials. If desired, in certain instances, this balancing of the straight chain constituents in the light and heavy feed may also be effected by recycling part of the unadsorbed constituents so as to dilute the stream containing the most straight chain constituents.

When the simultaneous fractionation of two selected separate feed streams is carried out, an appropriate recirculation of either the straight chain components or the non-straight chain components can be effected to result in a balancing of the straight chain constituents in each feed stream, or the flow rates of the individual feeds can be proportioned to contain equivalent amounts of the straight chain constituents.

Regardless of the source of the two feed streams, they each are controlled to have equivalent amounts of straight chain constituents by any of the ways mentioned above. Thus on a time basis, each of a plurality of separate adsorbent beds, either stationary or moving, will be contacted with equivalent amounts of the straight chain constituents and will desorb through displacement exchange an equivalent quantity of the straight chain constituents previously adsorbed from the other feed.

In the process of this invention, employing either the split feed or the dual feed streams, no separate heating or stripping steps are needed to effect desorption of adsorbed materials from the adsorbent. The adsorbent is continuously employed in the adsorptive fractionation of one or the other of the feed streams. The adsorption efficiency on a time basis is 100%. This materially reduces the adsorbent inventory required to treat a given quantity of feed and substantially simplifies the process since no heating and stripping steps as such are needed.

The adsorbent employed in the process of this invention is a solid granular material having a mesh size range between about 2 and 100 mesh and preferably between about 4 and about 30 mesh. It is used in the form of a dense compact bed of material through which the feed streams alternately pass, either in the vapor phase or in the liquid phase. The process may employ the adsorbent in the form of a single static bed of material in which case the process is only semi-continuous. Preferably, a plurality of two or more static beds of adsorbent is employed with appropriate remotely operable valving so that the feed stream is passed through one or more of the adsorbers in a set while the exchange displacement stream passes through one or more of the other adsorbers in the set. In this case the feed and product flows are continuous, in either the vapor or liquid phases, and either up or down through the adsorbent. When the granular adsorbent is sufficiently rugged physically then the moving solids bed modification may be employed in which flow of feed is maintained continuously through an adsorption zone, the flow of displacement exchange fluid is maintained continuously through a desorption zone, and the granular adsorbent is recirculated successively through these two zones. With the smaller sized mesh ranges of adsorbent, the material may be fluidized in and by the fluid streams contacting it, although the compact bed modifications are preferred since a greater number of theoretical and actual contact stages are more readily obtained in smaller and simpler equipment.

The adsorbents employed in the practice of the present invention are the natural or synthetic crystalline partially dehydrated metallo-alumino silicates having substantially uniform pores of about 5 A. in diameter. The composition of a typical synthetic zeolite having a pore size of about 4 A. is $[Na_2O \cdot Al_2O_3 \cdot (SiO_2)_2]$. It may be prepared by heating stoichiometric quantities of alumina and silica and excess caustic under pressure. The excess caustic is washed out and a different metal ion may be introduced by ion exchange. Part of the sodium in this material can be ion exchanged with concentrated salt solutions at superatmospheric pressure and temperatures of 150–300° C. to introduce other metal ions such as calcium to produce $[CaO \cdot Al_2O_3 \cdot (SiO_2)_2]$ 0.7 $[Na_2O \cdot Al_2O_3 \cdot (SiO_2)_2]$ 0.3 having a pore size of about 5 A. Certain naturally occurring materials such as cahbezite, analcite, gmelinite, and the like can be heated to effect a partial dehydration and obtain an activated zeolitic adsorbent similar in adsorption properties to the manufactured zeolites. These natural and synthetic materials are all zeolites and their sodium and calcium derivatives are very stable adsorbents which apparently have "pores" available for adsorption which are quite uniform in size. Other derivatives have different sized "pores." The molecules which are the more readily adsorbable and for which the adsorbent exerts preferential adsorptive forces are those having straight chain molecules whose minimum dimensions are equal to or slightly less than these pore dimensions. Thus the normal paraffins and normal olefins with cross chain dimensions of about 5 A. are very strongly and very readily adsorbed by these materials. However the non-straight chain hydrocarbons, i.e., the branched chain paraffins or olefins, and the naphthene and aromatic hydrocarbons, all having molecular dimensions in the shortest direction in excess of 5 A. are substantially non-adsorbable. These adsorbents are thus selective for normal paraffins and normal olefins if present, and will not adsorb any appreciable quantity of other hydrocarbons.

The synthetic crystalline partially dehydrated metallo alumino silicate of the present class zeolitic adsorbents are available commercially under the trade name "Molecular Sieves 5 A."

The metallo-alumino silicate adsorbent of the present class adsorb polar molecules to a certain extent. In gasoline treating this interferes with the fractionation of gasoline hydrocarbons as a function of molecular shape. Accordingly it is contemplated in this invention to contact the feed stream first with a material which exhibits very strong adsorptive forces for these polar materals and remove them from the stream to be treated. This preadsorption or pretreating of the feed may be accomplished by contacting the feed stream with an inorganic halide such as copper chloride, calcium chloride, magnesium chloride and the like. One preferred form of this preteratment is to contact the feed with the partially dehydrated metallo-alumino silicate designated as molecular sieve 13X. In this way large and highly polar materials such as ethers, thio-ethers, water, alcohols, mercaptans and amines are readily removed from the feed. Also removable in this way are the highly polar nitrogen and sulfur compounds which commonly occur in small amounts in gasolines. These specifically include such materials as thiophene and the alkylated thiophenes, pyridine and alkylated pyridines. Thus this pretreatment removes these polar materials and prevents them from interfering with the subsequent fractionation in which the feed is separated into streams containing components of a specific molecular size or structure. This preadsorption can be applied to each of two separate feeds, or to the single feed prior to splitting it into the light and heavy feeds.

Figure 3:
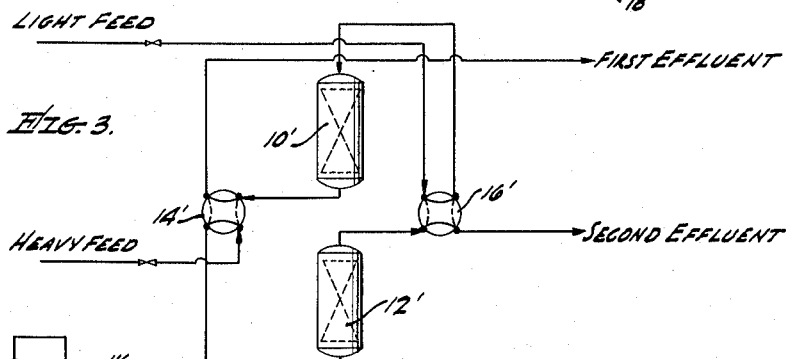
Figure 2:
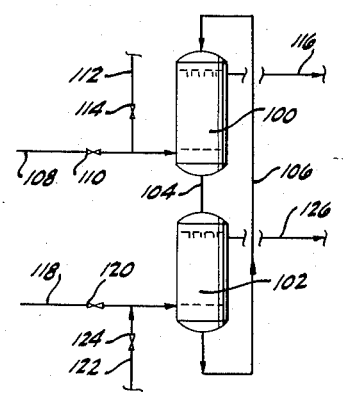

The present invention will be more readily understood by reference to the accompanying drawings in which:

Figure 1 is a schematic flow diagram of the process of this invention employing two static beds of adsorbent which are operated in a staggered sequence alternately contacting a light feed stream and a heavy feed stream, Figure 2 is a schematic flow diagram of the process utilizing a circulating stream of granular adsorbent, and Figure 3 shows a modified part of Figure 1 in which the feeds contact the adsorbent in opposite directions.

Referring now more particularly to Figure 1, the essential elements of the processing scheme include adsorbers 10 and 12, inlet and outlet four-way control valves 14 and 16, cycle timer operator 18 which operates the four-way control valves, light raffinate still 20 provided with overhead condenser 22 and bottoms reboiler 24, and heavy raffinate still 26 provided with overhead condenser 28 and bottoms reboiler 30. When separate and independent feed streams of different boiling point or range are employed, feed splitter still 32 is not employed, but when a single feed stream of wide boiling range is to be separated, feed splitter still 32 serves to produce from this single feed the light or low-boiling feed and the heavy or high-boiling feed stream required in this process. Still 32 is provided with overhead condenser 34 and bottoms reboiler 36.

*Example I*

The process of this invention is applied to the upgrading of a light catalytically reformed gasoline containing straight chain and non-straight chain hydrocarbons having 6 and 7 carbon atoms per molecule. This light gasoline is introduced through line 38 at a rate controlled by valve 40 through optional preadsorber 39 into feed splitter still 32. Still 32 is operated at a 20 to 1 reflux ratio and has 18 theoretical plates. The overhead vapor, which constitutes the light feed stream, consists of a $C_6$ hydrocarbon fraction with a boiling range of from 150° F. to 174° F. and is removed at the top of still 32 through line 42 controlled by valve 44. The bottoms product, which constitutes the heavy feed stream, is removed through line 46 at a rate controlled by valve 48, and consists essentially of $C_7$ hydrocarbons boiling between 174° F. and 218° F.

The light feed vapor containing normal and branched chain $C_6$ hydrocarbons is passed through line 50 through the interconnected ports of inlet control valve 14 through line 52, into and through adsorber 10 which is filled with a zeolitic, metallo-alumino silicate having pores of approximately 5 A. diameter. The adsorbent is saturated with the normal heptane which was adsorbed from the heavy feed stream in the preceding cycle of operation. The displacement exchange occurring in adsorber 10 in this part of the cycle is one in which the normal hexane of the light feed vapor is adsorbed on the adsorbent thereby displacing the adsorbed normal heptane into the vapor phase. The light unadsorbed or raffinate material, consisting essentially of iso-hexane and lower boiling materials, is removed from adsorber 10 through line 54 in admixture with the desorbed normal heptane vapor. This first product flows through line 54 through the interconnected ports of outlet control valve 16 through line 56 into light raffinate still 20. The overhead product from this still comprises the iso-hexane and lower boiling materials of the unadsorbed light feed stream, and flows through line 58 at a rate controlled by valve 60. The bottoms product from still 20 consists of the normal heptane desorbed from the adsorbent by the light feed, and this material is produced through line 62 at a rate controlled by valve 64.

Simultaneously with the contacting of the light feed stream in adsorber 10, the adsorbent in adsorber 12 is being contacted with the heavy feed stream. This material flows in the vapor phase through line 66 through the interconnected ports of outlet control valve 14 through line 68 into adsorber 12. Since the adsorbent here was contacted the light feed in the previous cycle of operation, it is saturated with the normal hexane adsorbed from that feed stream. The displacement exchange now occurring in adsorber 12 is one of preferential adsorption of the normal heptane vapor thereby displacing the adsorbed normal hexane into the vapor phase in admixture with the unadsorbed iso-heptane and other components of the heavy feed. This is the heavy unadsorbed raffinate or second product and it flows through line 70 through the interconnected ports of outlet control valve 16 into heavy raffinate still 26. The overhead product from still 26 consists of the desorbed normal hexane and it is produced through line 74 controlled by valve 76. The bottoms product from still 26 consists of the unadsorbed components of the heavy feed, principally iso-heptane, and this material is produced through line 78 at a rate controlled by valve 80.

The unadsorbed material from the light feed is thus produced as an overhead product from still 20 and the unadsorbed material from the heavy feed is produced as a bottoms product from still 26. Since both of these are branched chain olefins and paraffins and aromatic hydrocarbons from which the normal paraffins have been removed, they have high antiknock ratings and may be combined to produce a premium fuel or blending stock. The normal paraffins of low antiknock rating are produced as a bottoms product and as an overhead product from stills 20 and 26 respectively and these materials may be sent to further processing or storage facilities not shown.

In this example the light feed stream had a research knock rating with 3 ml. of TEL of 93.1 while the unadsorbed fraction of this feed had a knock rating of 103.1. The heavy feed stream had a research knock rating with 3 ml. of TEL of 80.7 and the unadsorbed fraction thereof had a knock rating of 90.0. The substantial improvement in the knock rating by the removal of normal paraffins is readily apparent.

Referring again to Fig. 1 and to the previous discussion concerning the recirculation of the straight chain constituents to produce a balance of straight chain materials in each of the light and heavy feed streams, normal heptane vapor may be recirculated for combination with the heavy feed from the bottom of light raffinate still 20 through line 82 at a rate controlled by valve 84. The light straight chain material, namely normal hexane, may be recirculated through line 86 at a rate controlled by valve 88 for combination with the light feed stream. Also, if desired, the same balancing may be effected by recirculating a portion of the unadsorbed materials so as to effect a balancing of the straight chain constituents by a dilution effect. In this way the exchange displacement occurring during each contact of the light and the heavy feeds with the adsorbent continues to the same extent so that the desorption efficiency of both the light and heavy feed streams is the same.

*Example II*

The process of this invention is applied to the simultaneous fractionation of two narrow cut gasoline streams, the light stream consisting essentially of $C_6$ hydrocarbons and the heavy stream consisting essentially of $C_7$ hydrocarbons. In this case the light hexane boiling range feed stream is introduced into the system described in Example I through line 90 at a rate controlled by valve 92, valve 44 being closed, and the heavy heptane boiling range stream enters through line 94 controlled by valve 96. In this way feed splitter still 32 is shut down and the process continues exactly as described in connection with Example I.

Example III

The process of this invention was applied to the simultaneous fractionation using metallo-alumino silicate adsorbents with pore diameters of 5 A., to the simultaneous separation of a cracked stream containing essentially $C_6$ hydrocarbons including normal hexene, as the light feed stream and a heavy feed stream containing hydrocarbons of 8, 9, and 10 carbon atoms per molecule without olefins. It is found that these particular adsorbents exhibit a preference for adsorption which is approximately equal when the normal olefin involved has about 3 carbon atoms per molecule less than the normal paraffin involved. In the process of Figure 1 the normal hexene-containing light feed flows through line 90 into and through adsorber 10 to produce a light raffinate containing displaced paraffins of 8 to 10 carbon atoms per molecule together with the branched chain and other non-adsorbable $C_6$ hydrocarbons. The overhead from light raffinate still 20 consists of these unadsorbed $C_6$ hydrocarbons while the bottoms fraction of this still consists of the normal paraffins from the heavy feed, namely normal octane, normal nonane, normal decane. The heavy feed containing normal paraffins in the $C_8$ through $C_{10}$ range is introduced through lines 94 and 66 through adsorber 12 in which they are adsorbed in an exchange displacement with the normal hexene saturating the adsorbent. The heavy raffinate is fractionated in still 26 to produce an overhead product comprising the normal hexene adsorbed from the light feed and a bottoms product consisting of the unadsorbed constituents of the heavy feed, including the branched chain hydrocarbons of 8 through 10 carbon atoms per molecule.

Example IV

This same process is applicable to the simultaneous separation of normal hexene from a $C_6$ fraction and a normal nonane from a $C_9$ fraction. The light $C_6$ feed was introduced through lines 90 and 50 and was contacted in adsorber 10 with the adsorbent thereby adsorbing the normal hexene and displacing the adsorbed normal nonane therefrom. Light raffinate still 20 separates an overhead product consisting of the non-adsorbable $C_6$ hydrocarbons and a bottoms product consisting of the displaced normal nonane. The heavy feed containing normal nonane is introduced through lines 42 and 66 and passes through adsorber 12 in which the normal nonane is adsorbed displacing normal hexene. The heavy raffinate still 26 produces as an overhead product normal hexene and the non-adsorbed $C_9$ hydrocarbons are produced as a bottoms product therefrom through line 78.

Referring now more particularly to Figure 2, a process and apparatus modification is shown which permits circulation of the adsorbent through two adsorbers 100 and 102. The adsorbent flows downwardly as a moving bed successively through adsorber 100 through transfer line 104 and into and through adsorber 102. The adsorbent is then circulated from adsorber 102 through conveyor 106 back into adsorber 100. The light feed is introduced into adsorber 100 through line 108 controlled by valve 110 together with any recycle materials as discussed previously which are mixed with the light feed by passing them through line 112 controlled by valve 114. In adsorber 100 the straight chain components of the light feed are adsorbed, the straight chain components of the heavy feed which saturate the adsorbent in adsorber 100 are displaced thereby, and a light raffinate containing the unadsorbable light materials and the displaced heavy straight chain materials is produced therefrom through line 116. It is fractionated in an identical fashion to that discussed previously in connection with Figure 1.

The heavy feed is introduced through line 118 controlled by valve 120 into adsorber 102 and may be mixed with circulated constituents as discussed above and which pass through line 122 controlled by valve 124. Herein the absorbents saturated with the light straight chain constituents adsorbs the heavy straight chain constituents displacing the light materials from the adsorbent. The heavy raffinate is removed through line 126 and contains the unadsorbed heavy feed materials together with the straight chain materials from the light feed. This heavy raffinate is also fractionated in the manner of Figure 1. The circulating adsorbent modification of Figure 2 may be applied to any or all of the examples given in connection with Figure 1. It has an advantage in that the inlet and outlet four-way control valves and the cycle timer instrument of the static bed modification may be eliminated, but it requires a means for conveying the adsorbent and an adsorbent which is sufficiently rugged physically to be moved without undue attrition losses.

In Figure 3, a modified valving arrangement similar to that employed in the process of Figure 1 is shown, but in which the light and heavy feeds contact the adsorbent while flowing in opposite directions in adsorbers 10' and 12' with valves 14' and 16' connected as shown. An analogous modified connection permits the reverse system of opposite flow. This is a preferred manner of operating as improved contacting efficiencies have been found.

It should be understood also that the contact may either be in the liquid or the vapor phase, with due consideration being given to the reversals of adsorption preference by the adsorbent which sometimes occur with a change in phase.

Prolonged operation may result in adsorbent deactivation and it is within the contemplation of this invention to regenerate the adsorbent periodically by any convenient means such as high temperature steam stripping, burning with flue gas as in catalyst regeneration, etc.

The foregoing description of several modifications of the present invention will serve to explain to those skilled in the art the principles of the present invention and the application thereof to various complex hydrocarbon mixtures for the removal of straight chain paraffins and olefins therefrom. These hydrocarbons are usually present in minor proportion, particularly with reformed gasolines, so that the unadsorbed materials consist of aromatic and branched chain paraffin hydrocarbons of high antiknock rating.

The process of this invention thus consists of an improved fractionation process for complex mixtures employing the principles of solid adsorption and distillation in such a way so as to remove specific materials from the feed stream by means of the adsorbent and whereby the ordinary heating and gas stripping or liquid washing of the rich adsorbent have been completely eliminated. The process of this invention may be operated under pressure or under vacuum, and the actual operating pressures are determined by the pressure at which the feed stream or streams is or are available and the boiling range, and whether the material being contacted is desirably in the vapor phase or the liquid phase. The proper operating pressure can be determined by those skilled in the art from known physical characteristics of the materials to be separated; namely the bubble point and dew point of the complex hydrocarbon mixtures and the known way in which these change with pressure. The adsorption temperatures employed in the process of this invention are also determined by the physical characteristics of the feed stream and the operating pressure and also whether a vapor phase or a liquid phase contact is desired. In treating complex gasoline streams the operating temperature is largely determined by the dew point and the bubble point of the stream at a given operating pressure. For example, adsorption temperatures above the dew point will obviously be in the vapor phase while operating temperatures below the bubble point will be in the liquid phase. It is within the contemplation of the present invention to adsorb the feed stream at a temperature between its bubble point and its dew point so that a mixed phase adsorption or displacement exchange desorption will be maintained for some special streams, and obviously one contact can be in the vapor phase followed by another in the liquid phase if desired, or vice versa.

The process of Example IV above is very advantageously applied to the simultaneous separation of an unsaturated $C_2$ hydrocarbon stream and a saturated $C_6$ hydrocarbon stream. The light stream, a mixture comprising ethylene and ethane for example, is contacted in adsorber 10 with the adsorbent to displace normal hexane and adsorb ethylene. Light raffinate still 20 separates ethane overhead and normal hexane as bottoms. The heavy feed, a $C_6$ natural gasoline cut for example, contacts the adsorbent displacing ethylene and adsorbing normal hexane. Heavy raffinate still produces ethylene overhead and the non-adsorbed $C_6$ hydrocarbons as a bottoms product. A $C_5$ hydrocarbon mixture can be substituted for the $C_6$ stream in this example. A $C_3$ mixture containing propylene can be substituted for the $C_2$ stream above. Other pairs of streams, such as ones comprising normal butene and normal heptane, etc., may be so treated in which the lighter unsaturated hydrocarbon-containing stream comprises an unsaturated hydrocarbon having about two to four fewer carbon atoms per molecule than the saturated hydrocarbon in the heavier saturated hydrocarbon feed.

Although distillation is described as the procedure for separating the light and heavy constituents from the first and second effluents, it should be understood that other methods can be substituted such as solvent extraction, crystallization, azeotropic distillation, steam stripping, and the like depending upon the nature of the constituents.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. The process for treating two fluid hydrocarbon mixtures of differing boiling range, each of which comprises straight chain and non-straight chain components, to separate the straight chain components therefrom which comprises: (1) flowing the first of said mixtures in contact with a solid granular adsorbent consisting essentially of a partially dehydrated zeolitic metallo alumino silicate having substantially uniform intracrystalline pores of about 5 A. in diameter, said adsorbent having adsorbed thereon straight chain components of the second of said mixtures, whereby the adsorbed straight chain components of said second mixture are desorbed and the straight chain components of said first mixture are adsorbed, and there is obtained a first effluent comprising the non-straight chain components of said first mixture and the desorbed straight chain components of said second mixture; (2) separating the said first effluent from the adsorbent; (3) then flowing said second mixture in contact with said adsorbent, whereby the adsorbed straight chain components of said first mixture are desorbed and the straight chain components of said second mixture are adsorbed, and there is obtained a second effluent comprising the non-straight chain components of said second mixture and the desorbed straight chain components of said first mixture; (4) separating the said second effluent from the adsorbent; (5) during said steps (1) and (3) controlling the relative flow rates of said first and second mixtures so that substantially equivalent amounts of straight chain components are adsorbed in each of said steps; and (6) treating said first and second effluents separately to separate therefrom the straight chain components thereof.

2. The process of claim 1 wherein the compositions of said first and second mixtures are such that in steps (1) and (3) substantially equivalent amounts of straight chain components are adsorbed, and, in step (5), the said flow rates are controlled so as to be substantially equal.

3. The process of claim 2 wherein the compositions of said first and second mixtures are initially not such that substantially equivalent amounts of straight chain components would be adsorbed while maintaining substantially equal flow rates in steps (1) and (3), and prior to effecting said steps (1) and (3) sufficient of the straight chain components separated in said step (6) is admixed with one of said mixtures to render its composition such that substantially equivalent amounts of straight chain components are adsorbed in steps (1) and (3); and, in step (5), the said flow rates are controlled so as to be substantially equal.

4. The process of claim 2 wherein the compositions of said first and second mixtures are initially not such that substantially equivalent amounts of non-straight chain components would be adsorbed while maintaining substantially equal flow rates in steps (1) and (3), and prior to effecting said steps (1) and (3) sufficient of the non-straight chain components separated in said step (6) is admixed with one of said mixtures to render its composition such that substantially equivalent amounts of non-straight chain components are adsorbed in steps (1) and (3), and, in step (5), the said flow rates are controlled so as to be substantially equal.

5. The process for treating two hydrocarbon mixtures of different boiling range, each of which consists essentially of straight chain and non-straight chain hydrocarbons having boiling points within the gasoline boiling range, which comprises: (1) flowing the lower boiling mixture in contact with a solid granular adsorbent consisting essentially of a partially dehydrated zeolitic metallo alumino silicate having substantially uniform intracrystalline pores of about 5 A. in diameter, said adsorbent having adsorbed thereon straight chain components of the higher boiling mixture, whereby said adsorbed straight chain components of said higher boiling mixture are desorbed and the straight chain components of the lower boiling mixture are adsorbed, and there is obtained a first effluent comprising the non-straight chain components of the lower boiling mixture and the desorbed straight chain components of the higher boiling mixture; (2) separating said first effluent from said adsorbent; (3) then flowing said higher boiling mixture in contact with the adsorbent, whereby the adsorbed straight chain components of the lower boiling mixture are desorbed and the straight chain components of the higher boiling mixture are adsorbed, and there is produced a second effluent comprising the non-straight chain components of the higher boiling mixture and desorbed straight chain components of the lower boiling mixture; (5) during steps (1) and (3) controlling the relative flow rates of said lower boiling and higher boiling mixtures so that substantially equivalent amounts of straight chain components are adsorbed in each of said steps; and (6) separately distilling said first and second effluents to separate the straight chain components therefrom.

6. The process of claim 5 wherein said hydrocarbon mixtures are obtained by distilling a single gasoline boiling range mixture of relatively wide boiling range into a lower boiling fraction and a higher boiling fraction.

7. The process of claim 5 wherein the compositions of said first and second mixtures are such that in steps (1) and (3) substantially equivalent amounts of straight chain components are adsorbed, and, in step (5), the said flow rates are controlled so as to be substantially equal.

8. The process of claim 5 wherein the compositions of said first and second mixtures are initially not such that substantially equivalent amounts of straight chain components would be adsorbed while maintaining substantially equal flow rates in steps (1) and (3), and prior to effecting said steps (1) and (3) sufficient of the straight chain components separated in said step (6) is admixed with one of said mixtures to render its composition such that substantially equivalent amounts of straight chain components are adsorbed in steps (1) and (3), and, in step (5), the said flow rates are controlled so as to be substantially equal.

9. The process of claim 5 wherein the composition of said first and second mixtures are not such that substantially equivalent amounts of non-straight chain components would be adsorbed while maintaining substantially equal flow rates in steps (1) and (3), and prior to effecting said steps (1) and (3) sufficient of the non-straight chain components separated in said step (6) is admixed with one of said mixtures to render its composition such that substantially equivalent amounts of non-straight chain components are adsorbed in steps (1) and (3) and, in step (5), the said flow rates are controlled so as to be substantially equal.

References Cited in the file of this patent

UNITED STATES PATENTS

| | | |
|---|---|---|
| 2,306,610 | Barrer | Dec. 29, 1942 |
| 2,566,613 | Hepp | Sept. 1, 1951 |
| 2,576,525 | Lipkin | Nov. 27, 1951 |
| 2,693,495 | Hastings et al. | Nov. 2, 1954 |
| 2,731,149 | Findlay | Jan. 17, 1956 |
| 2,754,344 | Weatherly | July 10, 1956 |
| 2,818,449 | Christensen et al. | Dec. 31, 1957 |
| 2,818,455 | Ballard | Dec. 31, 1957 |
| 2,854,495 | Fear | Sept. 30, 1958 |

Notice of Adverse Decision in Interference

In Interference No. 91,866 involving Patent No. 2,935,467, R. N. Fleck and C. G. Wight, Fractionation process using zeolitic molecular sieves, final judgment adverse to the patentees was rendered Mar. 3, 1964, as to claims 1, 2, 5, 6 and 7.

[*Official Gazette April 28, 1964.*]